Oct. 25, 1955  R. C. WILSON, JR  2,721,764
SPRINKLER APPARATUS
Filed Aug. 9, 1954
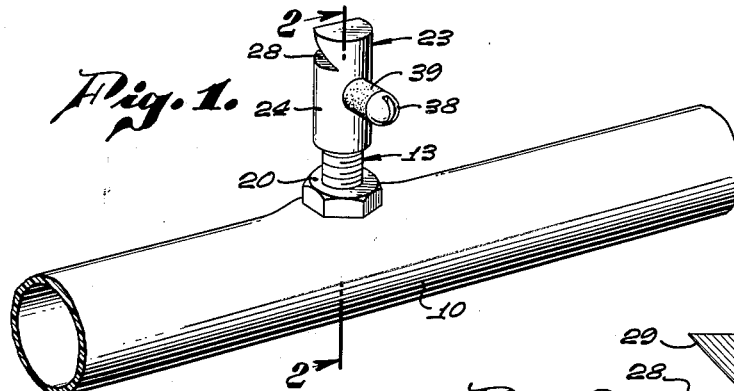
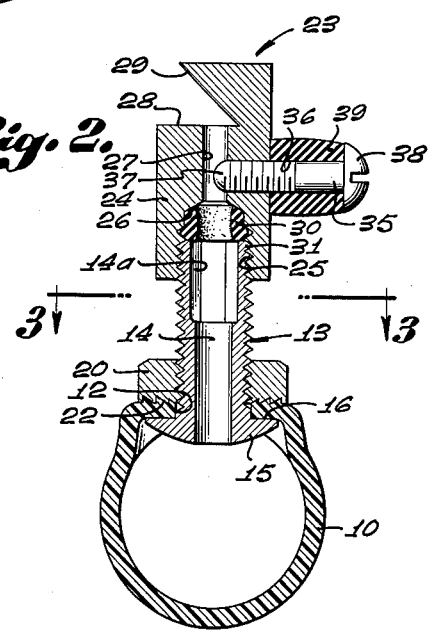
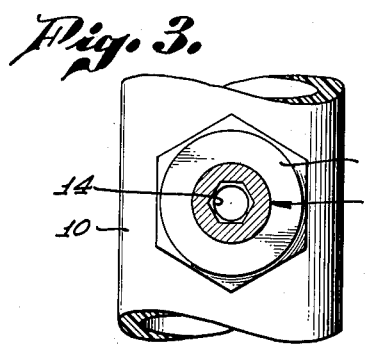
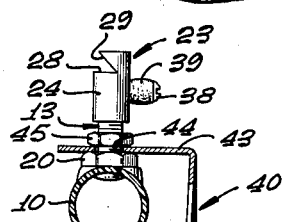
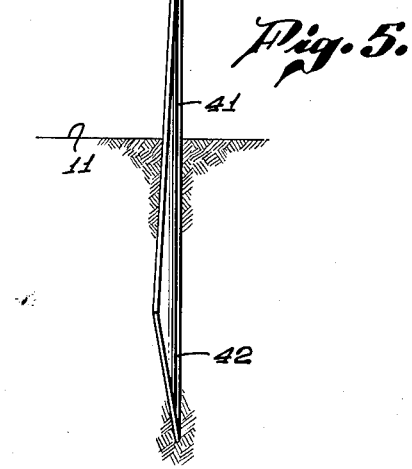
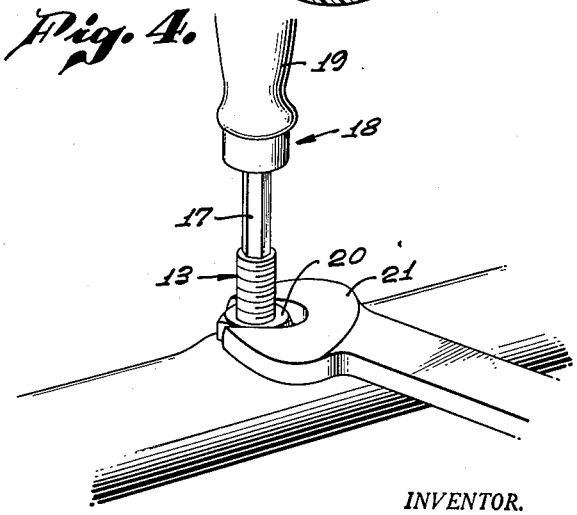
INVENTOR.
*Roy C. Wilson, Jr.*
BY
*Bernard Kiegel*
ATTORNEY.

United States Patent Office 2,721,764
Patented Oct. 25, 1955

2,721,764

SPRINKLER APPARATUS

Roy C. Wilson, Jr., Santa Paula, Calif., assignor to Plastic Irrigation Products Company, Santa Paula, Calif., a partnership Application August 9, 1954, Serial No. 448,686

8 Claims. (Cl. 299—106)

The present invention relates to apparatus particularly adapted for spraying water over planted regions of farms, the planted areas adjacent houses, and the like.

An object of the present invention is to provide a simple and comparatively inexpensive apparatus for sprinkling or spraying water over planted areas.

Another object of the invention is to provide sprinkler apparatus capable of being inserted easily in a water hose or pipe at any selected point along its length, or at a plurality of selected points along its length, and of being held in leakproof relation with respect to the hose or pipe.

A further object of the invention is to provide sprinkler apparatus capable of being inserted easily in leakproof relation in a pliant, elastic water pipe at any selected point along its length, and of thereafter being angularly adjusted to change the direction of discharge of water from the apparatus.

Yet another object of the invention is to provide sprinkler apparatus capable of being inserted easily in leakproof relation in a pliant, elastic water pipe at any selected point along its length, the apparatus serving as part of the instrumentality for supporting the pipe in elevated position with respect to the ground.

This invention possesses many other advantages, and has other objects which may be made more clearly apparent from a consideration of several forms in which it may be embodied. Such forms are shown in the drawings accompanying and forming part of the present specification. These forms will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is an isometric projection of one form of sprinkler apparatus attached to a pliant, elastic water pipe or hose;

Fig. 2 is an enlarged section taken along the line 2—2 on Fig. 1;

Fig. 3 is a cross-section taken along the line 3—3 on Fig. 2;

Fig. 4 is an isometric projection illustrating the manner of securing part of the sprinkler apparatus to the pliant, elastic pipe;

Fig. 5 is a combined cross-sectional and elevational view of a modified form of apparatus adapted to support the water pipe spaced above the ground.

The sprinkler apparatus, as disclosed in the drawings, is adapted to be inserted at selected points along the length of a pliant, elastic water pipe 10, that can be made of any suitable material, such as a vinyl resin or rubber. The water pipe may be laid along the ground 11 of planted areas that are to be sprinkled or sprayed with water, and a hole 12 of a proper diameter punched, or otherwise formed, in the water pipe at each point along its length where the sprinkler apparatus is to be secured to the pipe. A complete sprinkler apparatus can then be secured at such respective points to the pipe, to provide a proper supply of water to the planted areas.

As disclosed in the drawing, each sprinkler apparatus includes a tubular member 13 having a central passage 14 extending completely therethrough. The tubular member is externally threaded, terminating at one end in an enlarged head 15 that is substantially greater in diameter than the diameter of the hole 12 in the pliant, elastic pipe 10. As disclosed in the drawings, the hole 12 through the pipe wall may be slightly greater in diameter than the diameter of the tubular member 13, the head 15, after being inserted through the hole into the pipe, having an outwardly directed shoulder 16 adapted to engage the inner surface of the pipe surrounding the hole. The head 15 is rounded, to facilitate its insertion through the hole 12.

The outer portion 14a of the passage 14 through the tubular sprinkler member 13 is non-circular in shape. As shown, this outer portion 14a of the passage is hexagonal in cross-section, being adapted to receive a companion hexagonal shank portion 17 of a tool 18 having a handle 19 suitably secured to it (Fig. 4).

The insertion of the tool shank 17 into the passage 14a provides a comparatively easy and convenient manner of inserting the sprinkler member 13 in the pliant, elastic pipe 10. With the hexagonal shank in the passage of the member, the inner head 15 can be forced through the hole 12 in the pipe, the latter stretching sufficiently to allow the head 15 to pass completely therethrough, whereupon the pipe material will reclose around the tubular sprinkler member 13, the hole 12 reassuming its initial diameter. The shank 17 of the tool 18 is then withdrawn from the passage 14a and a clamp nut 20 threaded onto the tubular sprinkler member 13, whereupon the hexagonal shank 17 of the tool is again inserted in the hexagonal socket portion 14a of the tubular member passage. A suitable wrench 21 is then placed upon the clamp nut 20 and the handle 19 of the tool rotated in a left-hand direction (assuming that the threads are right-hand), which will feed the clamp nut 20 relatively downward until it is snugly engaging the external surface of the pipe 10 and has drawn the shoulders 16 of the head 15 firmly and in leakproof engagement against the inner surface of the pipe. In this manner, the tubular sprinkler member 13 has been firmly secured to the pipe 10.

Although the clamp nut 20 will hold the tubular sprinkler member 13 in proper assembled and leakproof position with respect to the pipe 10, a plurality of circular ridges 22 may be provided on the inner surface of the clamp nut 20, which will embed themselves in the pipe and thereby insure against the inadvertent loosening of the tubular sprinkler member 13 within the pipe.

The wrench 21 and tool 18 may now be removed and a sprinkler head 23 threadedly secured on the outer portion of the tubular sprinkler member 13. As disclosed, this sprinkler head includes a main body 24, the lower portion of which is provided with an internally threaded counterbore 25 companion to the external threads on the tubular sprinkler member 13. This counterbore terminates in an upwardly tapering shoulder 26 communicating with a reduced diameter central passage 27 through the sprinkler head. This passage 27 opens through a shoulder 28 in the sprinkler head disposed below an inclined deflecting surface 29 at the upper portion of the sprinkler head. Water issuing in an upward direction from the sprinkler head passage 27 will strike the deflecting surface 29 and be sprayed in an upward and laterally outward direction.

As assurance against water leakage through the threaded connection between the tubular sprinkler member 13 and the sprinkler head 23, a non-metallic sealing member 30 is provided, this member being in the form of a rubber or rubber-like sleeve whose lower end engages the upper end 31 of the tubular sprinkler member 13, and whose upper end engages the tapered shoulder 26 in the sprinkler head. When the sprinkler head 23 is threaded on the tubular sprinkler member 13, the rubber seal sleeve or packing 30 is compressed to some extent and will seal firmly against the tapered seat 26 and the end 31 of the tubular sprinkler member. In view of the length of this annular sealing member 30, the sprinkler head 23 can be turned with respect to the tubular sprinkler member 13, for the purpose of determining the direction of the deflecting surface 29 and the direction in which water will be sprayed as it leaves the sprinkler head. Such turning may occur through even a complete revolution and the annular sealing member 30 will still effectively seal against the members 26, 31 that it engages, to prevent leakage through the threaded connection, since the member 30 will still be under some compression. If the sprinkler head is turned to the right in effecting the adjustment, it will be moved downwardly on the tubular sprinkler member 13, compressing the seal 30 to a further extent. Turning of the sprinkler head in the opposite direction will decrease the extent of compression on the rubber seal member, but the latter will still be effective to remain in proper sealing engagement against the sprinkler head 23 and the upper end 31 of the tubular sprinkler member 13, in view of its ability to elongate.

The volume of water capable of exiting from the sprinkler head passage 27 can be controlled by a throttle valve device. This device is in the form of a threaded member or screw 35 threadedly received in a radial or lateral threaded bore 36 in the sprinkler head above the annular sealing member 30. The inner end 37 of the threaded member may be rounded, and can be removed completely from the central passage 27, or the threaded member 35 can be rotated within the sprinkler head 23 to the extent desired, to project the threaded member into the passage 27, for the purpose of restricting the flow of fluid therethrough. Rotation of the threaded member 35 in either direction may be accomplished by inserting a screw driver, or other suitable tool, in the outer head 38 formed on the member. If desired, assurance against inadvertent rotation of the threaded member 35, as by the action of water passing by its inner end 37, can be prevented by means of a holding device, which may take the form of a rubber or rubber-like sleeve 39 encompassing the threaded member 35, the outer end of the sleeve bearing against the head 38 of the threaded valve member 35 and its inner end engaging the exterior of the sprinkler head body 24.

The sets of sprinkler apparatus are easily inserted in the water pipe 10 at predetermined points along its length. The sprinkler heads 23 may be suitably adjusted to determine the direction in which the water will discharge and spray from each head and with respect to the pipe 10 through which the water is flowing. The annular sealing member 30 permits adjustment of the sprinkler head 23 with respect to the sprinkler member 13, and, in addition to performing its sealing function, serves as a retainer preventing inadvertent rotation of the sprinkler head with respect to the tubular sprinkler member. If it is desired to control the volume of water issuing through each sprinkler member, then the throttle valve element 35 can be appropriately turned, to determine the extent of projection of its inner end 37 within the central passage 27 through the sprinkler head. When the throttle valve member has been appropriately adjusted, it is retained in its adjusted position by the elastic retainer sleeve 39.

As disclosed in Fig. 5, the sprinkler apparatus may be adapted for supporting the pipe 10 above the ground, which will also, of course, support the sprinkler apparatus itself above the ground. Thus, a supporting stake 40, that may be made of metal, has a vertical portion 41 provided with a pointed lower end 42 to facilitate inserting of the stake in the ground 11, the vertical portion terminating in a horizontal lateral portion 43 integral therewith. This lateral portion is provided with a hole 44, to permit the tubular threaded member 13 to pass therethrough. The lateral portion 43 engages the upper end of the clamp nut 20 and is held thereagainst by a lock nut 45 that is also threaded on the tubular sprinkler member 13 and adapted to bear against the upper surface of the lateral portion 43. It is evident that the tubular stake 40 supports the sprinkler apparatus in a position spaced above and from the ground 11, causing the sprinkler apparatus to hold the pliant, elastic pipe 10 above the ground.

The inventor claims:

1. In sprinkler apparatus adapted to be secured to a pliant, elastic pipe having a hole through its wall: an externally threaded tubular sprinkler member having a passage therethrough and an inner head greater in diameter than the pipe hole, at least the outer portion of said passage being non-circular in cross-section to enable a companion tool to be inserted therein for forcing said head through said hole to the interior of the pipe; a clamp nut threaded on said member and adapted to force said head against the inner surface of the pipe; and a sprinkler head threaded onto the externally threaded portion of said tubular member and communicating with said passage.

2. In sprinkler apparatus adapted to be secured to a pliant, elastic pipe having a hole through its wall: an externally threaded tubular sprinkler member having a passage therethrough and an inner head greater in diameter than the pipe hole, at least the outer portion of said passage being non-circular in cross-section to enable a companion tool to be inserted therein for forcing said head through said hole to the interior of the pipe; a clamp nut threaded on said member and adapted to force said head against the inner surface of the pipe; a sprinkler head threaded onto said tubular member and communicating with said passage; and seal means clamped between said tubular member and sprinkler head to prevent leakage therebetween, said seal means permitting angular adjustment of said sprinkler head on said tubular member to vary the direction of discharge of fluid from said sprinkler head, while continuing to prevent fluid leakage between said tubular member and sprinkler head.

3. In a sprinkler apparatus adapted to be secured to a pliant, elastic pipe having a hole through its wall: an externally threaded tubular sprinkler member having a passage therethrough and an inner head greater in diameter than the pipe hole, at least the outer portion of said passage being non-circular in cross-section to enable a companion tool to be inserted therein for forcing said head through said hole to the interior of the pipe; a clamp nut threaded on said member and adapted to force said head against the inner surface of the pipe; a sprinkler head threaded on the externally threaded portion of said tubular member and having a passage communicating with said tubular member passage, said sprinkler head having a surface against which water issuing from its passage will strike and be deflected laterally.

4. In a sprinkler apparatus adapted to be secured to a pliant, elastic pipe having a hole through its wall: an externally threaded tubular sprinkler member having a passage therethrough and an inner head greater in diameter than the pipe hole, at least the outer portion of said passage being non-circular in cross-section to enable a companion tool to be inserted therein for forcing said head through said hole to the interior of the pipe; a clamp nut threaded on said member and adapted to force said head against the inner surface of the pipe; a sprinkler head threaded on said tubular member passage, said sprinkler head having a surface against which water issuing from its passage will strike and be deflected laterally; and a valve member adjustably mounted in said sprinkler head passage to control the flow of fluid therethrough.

5. In a sprinkler apparatus adapted to be secured to a pliant, elastic pipe having a hole through its wall: an externally threaded tubular sprinkler member having a passage therethrough and an inner head greater in diameter than the pipe hole, at least the outer portion of said passage being non-circular in cross-section to enable a companion tool to be inserted therein for forcing said head through said hole to the interior of the pipe; a clamp nut threaded on said member and adapted to force said head against the inner surface of the pipe; a sprinkler head threaded on said tubular member and having a passage communicating with said tubular member passage, said sprinkler head having a surface against which water issuing from its passage will strike and be deflected laterally; a valve member threaded into said sprinkler head, said valve member being rotatable to move it into said sprinkler head passage to control the flow of fluid therethrough; and a pliant, elastic sleeve surrounding and bearing against said valve member and engaging said sprinkler head to hold said valve member in various rotational positions with respect to said sprinkler head.

6. In sprinkler apparatus adapted to be secured to a pliant, elastic pipe having a hole through its wall: an externally threaded tubular sprinkler member having a passage therethrough and an inner head greater in diameter than the pipe hole, at least the outer portion of said passage being non-circular in cross-section to enable a companion tool to be inserted therein for forcing said head through said hole to the interior of the pipe; a clamp nut threaded on said member and engageable with the exterior of the pipe to force said head against the inner surface of the pipe; and a sprinkler head threaded on the externally threaded portion of said tubular member and communicating with said passage.

7. In sprinkler apparatus as defined in claim 6; wherein said clamp nut has circular ridges thereon adapted to grip the exterior of the pipe.

8. In sprinkler apparatus adapted to be secured to a pliant, elastic pipe having a hole through its wall: an externally threaded tubular sprinkler member having a passage therethrough and an inner head greater in diameter than the pipe hole, at least the outer portion of said passage being non-circular in cross-section to enable a companion tool to be inserted therein for forcing said head through said hole to the interior of the pipe; a clamp nut threaded on said member and adapted to force said head against the inner surface of the pipe; a sprinkler head threaded onto said tubular member and communicating with said passage; a stake adapted to be driven into the ground and having a laterally extending portion disposed over said tubular member and engaging said clamp nut; and a nut threaded on said tubular member and bearing against said laterally extending portion to hold it against said clamp nut, whereby said stake can support the pipe elevated above the ground.

References Cited in the file of this patent

UNITED STATES PATENTS

| | | |
|---|---|---|
| 1,177,884 | Molesta | Apr. 4, 1916 |
| 1,192,551 | Nelson | July 25, 1916 |
| 1,783,237 | Greer | Dec. 2, 1930 |
| 2,145,451 | McCoy | Jan. 31, 1939 |